No. 760,700. PATENTED MAY 24, 1904.
C. E. NORTH.
MILKING PAIL.
APPLICATION FILED JUNE 18, 1903.
NO MODEL.

Witnesses

Charles E. North,
Inventor
By his Attorney

No. 760,700. Patented May 24, 1904.

UNITED STATES PATENT OFFICE.

CHARLES E. NORTH, OF TRENTON, NEW JERSEY.

MILKING-PAIL.

SPECIFICATION forming part of Letters Patent No. 760,700, dated May 24, 1904.

Application filed June 18, 1903. Serial No. 162,074. (No model.)

*To all whom it may concern:*

Be it known that I, CHARLES E. NORTH, a citizen of the United States, residing in Trenton, Mercer county, New Jersey, have invented certain new and useful Improvements in Milking-Pails, of which the following is a specification.

This invention has to do with pails or receptacles used on dairy farms by the milkers; and the object of the invention is, broadly speaking, to protect the milk against the germs of fermentation, alteration, decomposition, and diseases and also against mechanical impurities.

In carrying out the invention the pail is so constructed that the milk issuing in a stream or jet from the udder enters the upper part or chamber of the pail through a suitably-restricted aperture. This upper chamber of the pail is separated from the main containing-chamber below by a straining-diaphragm of sterilized material, through which the milk is strained and flows by gravity into the receptacle below. Thus the milk at the moment of its issue from the udder enters a nearly-closed chamber and is protected in a great degree from contamination by germs floating in the surrounding air, and from this protected chamber it flows through the sterilized straining material into the closed chamber below.

Figure 1:
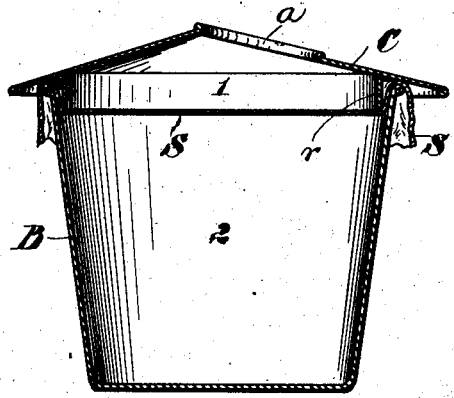
Figure 2:
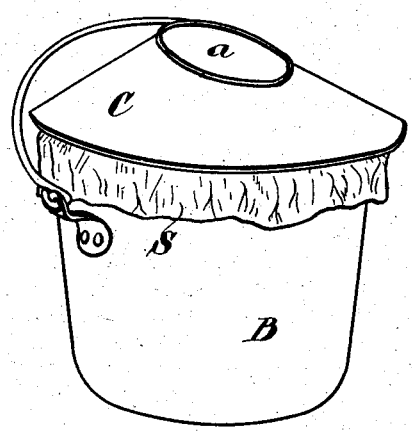

In the accompanying drawings, which illustrate a mechanical embodiment of the invention, Figure 1 is a section through axis of the pail, and Fig. 2 is a perspective view of the pail.

In the said drawings, B designates the body of the pail, and C the cover thereof. This cover is in the form of a cone and has in it at one side of the apex an aperture $a$, at which the stream of milk enters in milking. The oblique or eccentric disposition of the aperture is to present it properly to the stream or jet of milk and enable it to be contracted as much as possible in area as a protection against the admission of germs. The cover C closes over the body B wholly and has on its under side a rim $r$, which fits into the top of the body, and the cover is removable, so that the body and cover may be separated and both be thoroughly cleansed and sterilized.

When the cover is placed on the body to prepare for milking, a strainer S, of woven and sterilized material, is spread over the open body and the cover pressed down in place, whereby the rim $r$ clamps the strainer in place and stretches it in the form of a diaphragm, thus separating the outer partly-closed receiving-chamber 1 from the inner wholly-closed containing-chamber 2 in the body of the pail.

In the operation of milking the milk passes through the aperture $a$ to the nearly-closed receiving-chamber 1 and then passes by gravity through the strainer S into the chamber 2. The result is that the milk collected in the containing-chamber will be practically pure and free from all forms of contamination, and it will remain protected until the pail is taken to the proper place for emptying.

When the pails are emptied, the covers and strainers are removed and all three parts are thoroughly cleansed and sterilized.

One important advantage of this invention is that the strainer is so far below the aperture at which the milk enters that there is no spattering of the milk outside through said aperture and another is that the strainer covering the entire pail has an extensive area for straining. This prevents the impurities gathering in a thick layer on the strainer, and thus liable to be forced through with the milk.

Having thus described my invention, I claim—

1. A milk-pail comprising a body portion, having in it a containing-chamber for the milk, a removable, sterilized strainer of woven material covering wholly the open top of said body, and a removable, conical cover which covers the body and said strainer, said cover having in it a contracted aperture to receive the milk and inclosing a receiving-chamber separated from the containing-chamber by said strainer.

2. A milk-pail comprising a body B, a conical removable cover C therefor, said cover having in its conical surface a contracted aperture $a$ situated at one side of its apex, and having a rim $r$ which fits into the open top of the pail, and a sterilized removable strainer S which covers the entire open top of the body, is held in place by the cover, and separates the outer chamber 1 in the cover, from the inner chamber 2 in the body.

In witness whereof I have hereunto signed my name, this 17th day of June, 1903, in the presence of two subscribing witnesses.

CHARLES E. NORTH.

Witnesses:
  JOHN A. THOMPSON,
  JAMES B. BUTLER.